(12) United States Patent
Bajko

(10) Patent No.: US 7,606,910 B2
(45) Date of Patent: Oct. 20, 2009

(54) METHOD FOR INDICATING A UE THAT IT MUST REGISTER

(75) Inventor: Gabor Bajko, Budapest (HU)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/477,136

(22) PCT Filed: May 9, 2001

(86) PCT No.: PCT/EP01/05272

§ 371 (c)(1),
(2), (4) Date: Dec. 9, 2003

(87) PCT Pub. No.: WO02/091780

PCT Pub. Date: Nov. 14, 2002

(65) Prior Publication Data

US 2004/0199641 A1      Oct. 7, 2004

(51) Int. Cl.
*G06F 15/16* (2006.01)
*H04W 4/00* (2006.01)

(52) U.S. Cl. .................. 709/227; 709/230; 455/435.1

(58) Field of Classification Search ......... 709/227–235, 709/218; 455/435.1
See application file for complete search history.

(56) References Cited

U.S. PATENT DOCUMENTS

| | | | | |
|---|---|---|---|---|
| 5,241,594 | A * | 8/1993 | Kung ........................... | 713/151 |
| 5,889,944 | A | 3/1999 | Butt et al. | |
| 5,935,251 | A * | 8/1999 | Moore ......................... | 726/18 |
| 6,317,783 | B1 * | 11/2001 | Freishtat et al. ............ | 709/218 |
| 6,363,424 | B1 * | 3/2002 | Douglas et al. ............. | 709/224 |
| 6,480,583 | B1 * | 11/2002 | Kim ........................... | 379/93.17 |
| 6,715,082 | B1 * | 3/2004 | Chang et al. ................ | 713/201 |
| 6,754,482 | B1 * | 6/2004 | Torabi ........................ | 455/410 |
| 2002/0010785 | A1 * | 1/2002 | Katsukawa et al. ......... | 709/229 |

FOREIGN PATENT DOCUMENTS

| | | |
|---|---|---|
| EP | 1051054 A2 | 11/2000 |
| EP | 1051054 A2 * | 11/2000 |
| JP | 2000-349903 | 12/2000 |

(Continued)

OTHER PUBLICATIONS

M. Handley, et al., RFC2543, SIP: Session Initiation Protocol, Mar. 1999, IETF, Section 5 on p. 36, Section 7.4.4 on p. 78.*

(Continued)

*Primary Examiner*—William C Vaughn, Jr.
*Assistant Examiner*—Peling A Shaw
(74) *Attorney, Agent, or Firm*—Mintz, Levin, Cohn, Ferris, Glovsky, and Popeo, P.C.

(57) ABSTRACT

A method controls a network, wherein the networks offer services to registered users. The method includes the steps of receiving a service request from network device of a user, checking whether the user is registered or not, and if the user is not registered, generating a response message including a warn information and sending the response message to the network device of the user. The method can be performed on a corresponding network device. In this way, a user is informed that he has to register before he can obtain any services from the network.

19 Claims, 2 Drawing Sheets

FOREIGN PATENT DOCUMENTS

| | | |
|---|---|---|
| JP | 2001-5783 | 1/2001 |
| RU | 2 158 956 C1 | 11/2000 |
| WO | WO 99/52304 | 10/1999 |
| WO | WO 9952304 A1 * | 10/1999 |
| WO | WO 01/20846 A2 | 3/2001 |
| WO | WO 01/31472 A1 | 5/2001 |

OTHER PUBLICATIONS

3GPP TSG SA#11, 3GPP TS 23.228 V5.0.0, Apr. 2001, 3GPP, section 5.2.1 item 4, 5.2.2.3, 5.2.2.4 and item 5.*

Russian language version of Decision on Grant Patent for Invention dated Apr. 27, 2006, with English language translation.

Pang et al., "Implicit Deregistration with Forced Registration for PCS Mobility Management" Wireless Networks: vol. 7, Issue 1, pp. 99-104, Jan. 2001.

Shigeki Yamada et al., "Environmental Adaptive Personal Communication (EAPEC) Architecture for Ubiquitous Computing Networks", Techinical Report of IEICE, vol. 100, No. 670, p. 367 to p. 374, SSE2000-286, The Institute of Electronics, Information and Communication Engineers (CSDB: Domestic Institute Paper 200300086045).

J. Myers et al., "Post Office Protocol—Version 3", RFC1725 (Network Working Group Request for Comments: 1725), (Network Working Group Request for Comments: 1725), Nov. 1994, IETF.

"EN 300 940 V6.3.1 (Aug. 1999) Digital Cellular Telecommunications System (Phase 2+); Mobile Radio Interface Layer 3 Specification (GSM 04.08 Version6.3.1 Release 1997", Aug. 1999, ETSI, pp. 118-132.

* cited by examiner

METHOD FOR INDICATING A UE THAT IT MUST REGISTER

FIELD OF THE INVENTION

The present invention relates to a method and network for controlling a network which offers services to registered users.

BACKGROUND OF THE INVENTION

The invention concerns networks which offer services to registered users. For example, in the IP Multimedia (IM) Subsystem as defined by the $3^{rd}$ Generation Partnership Project (3GPP), it is necessary for an UE to be registered before the UE can make use of the multimedia services.

Thus, in case the user (i.e., UE) does not send a register request (e.g., a SIP (Session Initiation Protocol) REGISTER message) first, the network is not able to handle service requests from that user, which leads to a failure. In turn, the user is not notified about the failure and, hence, is not able to identify the reason for the failure, i.e., the non-acceptance of the service request.

Moreover, in a 3GPP environment, the network can initiate a Network Initiated De-registration. This is performed, for example, in order to avoid problems in the servers. The user may or may not be notified about the action, depending on whether he is previously subscribed to be notified and it is reachable or not.

If the user has been de-registered from the network but he was not notified because of one of the above listed reasons, he may anytime send a session initiation request to the network. If that is the case, the network can not serve the user since it is not registered. However, also in this case the user is not aware of the fact that he is no longer registered.

Thus, the above situations lead to the problem that a user can not be served and that the user is not aware why the network does not accept his service request.

SUMMARY OF THE INVENTION

Therefore, the object underlying the invention resides in removing the above drawbacks of the prior art.

This object is solved by a method for controlling a network, wherein the networks offers services to registered users, the method comprising the steps of
receiving a service request,
checking whether a user requesting the service is registered or not, and
if the user is not registered, generating a response message including a warn information into a response message and sending the response message to the user.

Alternatively, the above object is solved by a network control device for controlling a network, wherein the networks offers services to registered users, wherein the device is adapted
to receive a service request, to check whether a user requesting the service is registered or not, and generate a response message containing a warn information to the user, in case the user is not registered.

Thus, by the method and control device according to the invention, the user is automatically informed that he is not registered. Hence, an easy handling of service requests of non-registered users is achieved.

The response message may be a SIP (Session Initiation Protocol) response. Moreover, the SIP response may be a 403 Forbidden response. Hence, a predefined standard message may be used for transporting the warn information. Therefore, the invention can easily be applied into existing systems.

The warn information may comprise a warn-text. This warn-text may be intelligible to the user such that he can easily be informed about the situation.

The warn-text may be a predefined warn-text. In this way, the user can be informed more clearly, since the warn-text is predefined and, hence, familiar to the user.

The warn information may comprise a predefined warn-code. In this way, also the user equipment (UE) of the user can easily be informed about the non-registration by using the predefined code.

Furthermore, an automatic registration may be triggered in the network device of the user. That is, the network device of the user may be adapted to perform an automatic registration in reaction to the response message received which contains the specific warn-code. In this way, the necessary registration is performed without that the user has to command this.

Moreover, it may be checked whether the user had a valid registration before or not, wherein in case the user had no valid registration before, the information that a registration is required is inserted into the warn information.

Alternatively, it may be checked whether the user had a valid registration before or not and whether a de-registration of the user had been performed, and wherein in case the user had a valid registration before and a de-registration of the user had been performed, the information that a re-registration is required is inserted into the warn information.

Thus, also the condition that the user had a valid registration before and a de-registration was performed is considered, and the user is informed about this condition.

The network may be a third generation network, wherein the generating step is performed in a proxy call state control function (P-CSCF).

The network may be a third generation network, and wherein the generating step is performed in a serving call state control function (S-CSCF).

The invention also proposes a network device being connectable to a network, the network offering services to registered users, wherein the device is adapted to receive a message and to perform an automatic registration to the network in case the message contains a predetermined warn information. The warn information may contain a warn-code, and/or may contain a warn-text.

BRIEF DESCRIPTION OF THE DRAWINGS

The present invention will be more readily understood with reference to the accompanying drawings in which.

DETAILED DESCRIPTION OF PREFERRED EMBODIMENTS

In the following, preferred embodiments of the invention is described in more detail with reference to the accompanying drawings.

Figure 1:
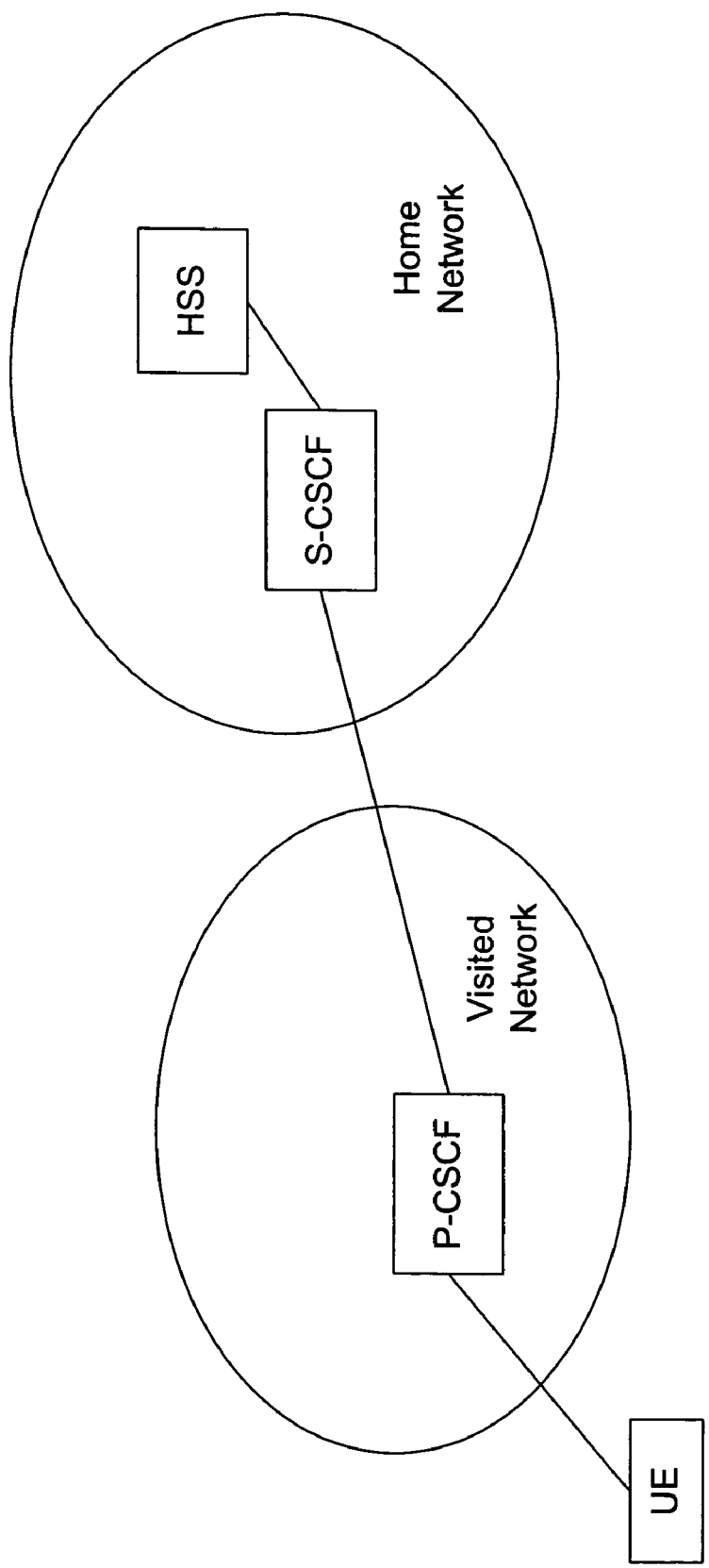
FIG. 1 shows a diagram of the network system to which a first and a second embodiment is applicable.

FIG. 1 shows a simplified network system to which the embodiments are applicable. The network system may configured according to IP Multimedia Subsystem concepts as defined by the $3^{rd}$ Generation Partnership Project (3GPP).

The network system comprises a home network of a User equipment (UE) and a visited network. The home network comprises a Serving Call State Control Function (S-CSCF) which controls services for the user (i.e., UE). The S-CSCF accesses an HSS (Home Subscriber Server) in order to obtain information regarding the user. The visited network comprises a Proxy Call State Control Function (P-CSCF) basically performs an interface function for connecting the UE to the S-CSCF in his home network. S-CSCF is located in the home network of the UE, which is roaming in the visited network and attached to the P-CSCF.

Next, the first embodiment is described. According to the first embodiment, it is assumed that the user sends an SIP (Session Initiation Protocol) INVITE message before it sends a REGISTER to the network. The network returns a 403 Forbidden message to the user with a warning header.

In SIP, warning headers are used in response messages in order to carry additional information about the status of a response. Warning headers comprises the following fields: warn-code, warn-agent and warn-text.

The warn-code is a number consisting of three digits. SIP-specific warn-codes start with a 3 as the first digit. The warn-agent indicates the name or pseudonym of the server which adds the warning header. The warn-text is a plain text intelligible to the human user.

According to the present embodiment, the warning header comprises a warn-text of "Registration Needed". This warn-text is associated with a 3GPP specific warn-code. Hence, it should start with another digit than 3 in order to distinguish it form SIP-specific warn-codes. The 3GPP warn-code should preferably trigger at UE a Register message to be sent towards the network.

Figure 2:
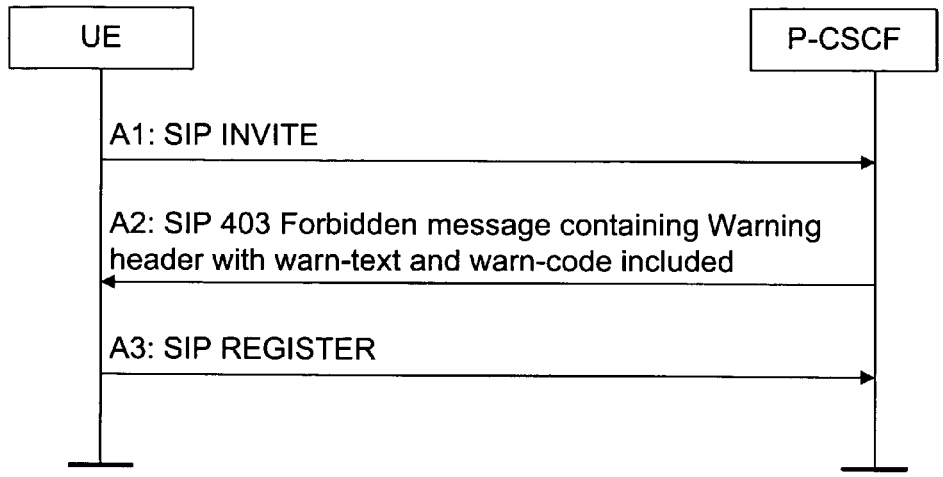
FIG. 2 shows a signaling diagram of the procedure according to the first embodiment.

FIG. 2 shows a signaling flow according to the first embodiment, which illustrates the above procedure in more detail. A person of ordinary skill in the art would readily appreciate that the flow may be carried out by a computer program embodied on a computer readable storage medium. As mentioned above, it is assumed that the user (i.e., UE) is not registered to the network. That is, the first action performed by the UE is sending a SIP INVITE request to the P-CSCF, as indicated in step A1. In this example, it is assumed that the UE is not registered, and a corresponding response is sent back to the UE in step A2.

That is, in step A2, the P-CSCF returns a 4.xx final response, preferably a 403 Forbidden Message to the UE. In the 403 Forbidden Message, a warning header containing a warn-text of, e.g., "Registration Needed" and a corresponding 3GPP specific warn-code is included. This warn-code should be standardized, and, for example, should preferably be defined by the IANA (Internet Assigned Numbers Authority).

The P-CSCF sends the 403 Forbidden Message to the UE in step A2. Thus, the UE is informed that the SIP INVITE message sent in step A1 was unsuccessful, and in addition the UE is also informed why the INVITE message was unsuccessful, namely, because the UE is not yet registered to the network.

Preferably, the UE is triggered by the 403 Forbidden Message to send a SIP REGISTER message, as indicated in step A3. By using the above-mentioned 3GPP specific warn-code, the UE can be triggered to automatically send such a register request without that the user has to input manually a corresponding request. That is, the UE may be adapted to automatically perform the registration in response to receiving the above-described warn-code.

After sending the SIP REGISTER message in step A3, the normal registration procedure is carried out. A detailed description thereof is omitted for simplifying the illustration.

It is noted that for the above-described automatic registration the warn-text is optional. That is, in order to trigger an automatic registration of the UE, only the warn-code is necessary.

The same procedure as described above may be used to trigger a Register from the UE when an INVITE arrives to the P-CSCF after the Registration of the user expired in P-CSCF, i.e., in a case in which the registration is timely limited. The "Registration Needed" warning header is preferably only be inserted by a P-CSCF, since this element provides an interface of the network to the UE.

It is noted that in the above description it is assumed that information about the status of user (i.e., registered or not registered) is stored in the HSS. However, this information may also be stored in a database in the S-CSCF or also in the P-CSCF. In this way, the need for forwarding the inquiries to the HSS or to the home network is eliminated.

Figure 3:
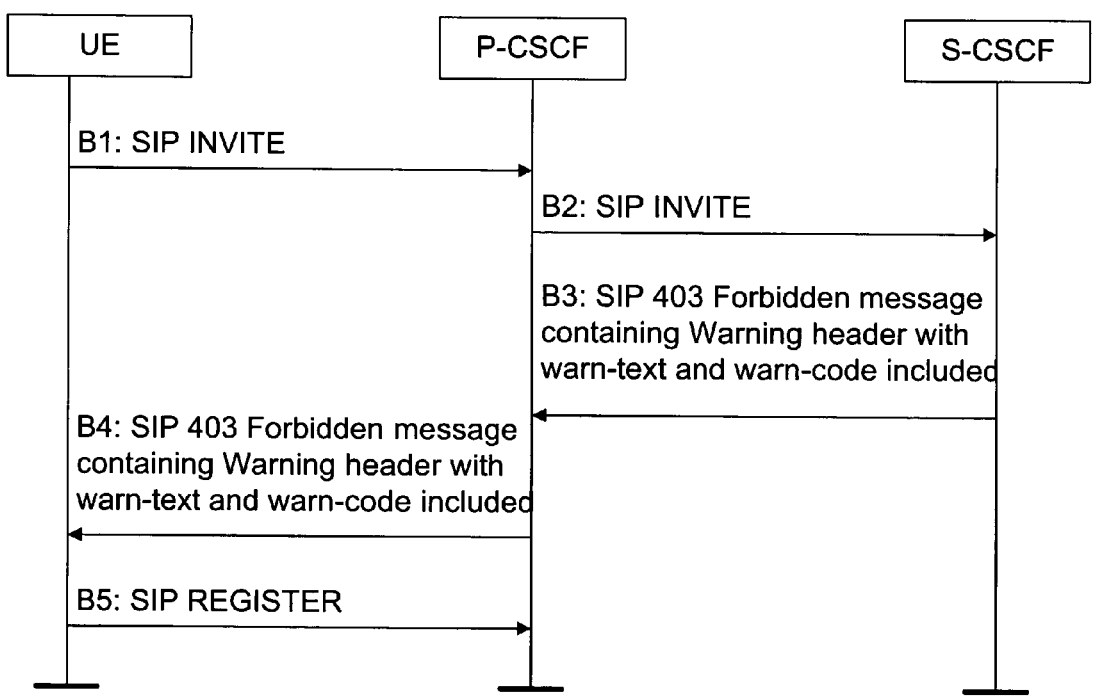
FIG. 3 shows a signaling diagram of the procedure according to a second embodiment.

Next, a second embodiment is described with reference to FIG. 3.

According to the second embodiment, it is assumed that the UE was registered, but that the home network where the UE is registered performs a Network Initiated De-registration for this user. This implies that S-CSCF will delete the user from the registered users' database. This may not implicitly imply that the P-CSCF will also delete it.

In the following, signalling for this case is described by referring to FIG. 3. In step B1, the UE sends a SIP INVITE message to the P-CSCFThere might be cases when the UE's registration is valid in P-CSCF but not valid anymore in S-CSCF. Hence, the P-CSCF forwards the SIP INVITE message to the S-CSCF in step B2.

However, the S-CSCF finds that the UE has been de-registered, or the timer associated with the registration expired, etc., i.e., UE no longer has a valid registration. Hence, the S-CSCF returns a 403 Forbidden response to the user. Since in this scenario the user might recently have a valid registration, the S-CSCF preferably inserts another warning header with a warn-text of "Re-Registration Needed". As described in the first embodiment, this warn-text should preferably be associated with a 3GPP specific warn-code (which may be the same as according to the first embodiment). The S-CSCF sends the 403 Forbidden message composed in this way to the P-CSCF (step B3), which in turn forwards it to the UE (step B4).

Similar as according to the first embodiment, the warn-text and the warn-code should preferably trigger at the UE a Re-Registration to be sent towards the network, as indicated in step B5. After this, the normal registration procedure is carried out. A detailed description thereof is omitted for simplifying the illustration.

The "Re-Registration Needed" warn-text is preferably only be inserted by an S-CSCF.

It is noted that in SIP a Registration and RE-Registration look exactly the same. The reason for having different warn-texts is to inform the user at the UE that the user is not registered to the network yet or that a recent valid registration was just invalidated by the network, respectively.

It is noted that the invention is not limited to the embodiments described above. Various amendments and modifications are possible.

In particular, the embodiments may be combined. That is, both procedures may be applied in a network system, and depending on the situation the 403 Forbidden message sent to the UE may include the "Registration Needed" or the "Re-Registration Needed" warn-text and a corresponding warn-code.

Furthermore, it is noted that the IP Multimedia Subsystem is only taken as an example. That is, the invention may be applied to any network system in which a user has to be registered before he may obtain any services.

Moreover, also the SIP protocol is only taken as an example. Instead, any protocol messages into which specific warn-texts and/or warn-code may be included, can be used.

The invention claimed is:

1. A method, comprising:
 receiving a service request from a network device of a user, wherein said service request is a session initiation protocol invite request;
 checking, in a network control device, whether the user is registered to a network or not, by referring to information about a registration status of the user stored in a home subscriber server or in the network control device being a proxy call state control function or a serving call state control function, wherein the network offers services to registered users; and
 when the user is not registered, generating a response message including warn information and sending the response message from the network control device to the network device of the user, wherein the response message is a session initiation protocol 403 forbidden message;
 wherein the warn information triggers an automatic registration in the network device of the user, in which the network device of the user sends a register request to the network control device automatically when the network device of the user receives the response message.

2. The method according to claim 1, wherein the warn information comprises a warn-text.

3. The method according to claim 2, wherein the warn-text is a predefined warn-text.

4. The method according to claim 1, wherein the warn information comprises a predefined warn-code.

5. The method according to claim 1, further comprising:
 checking whether the user had a valid registration before or not,
 wherein in case the user had no valid registration before, during generating the response message, the information that a registration is required is inserted into the warn information.

6. An apparatus, comprising:
 a connector configured to connect to a network, wherein the network is configured to offer services to registered users;
 a sender configured to send a service request to the network, wherein said service request is a session initiation protocol invite request;
 a receiver configured to receive a response message from the network; and
 a controller, wherein in case the response message comprises a predetermined warn information being a session initiation protocol 403 forbidden message indicating that the user is not registered to the network, the warn information triggers an automatic registration in the controller, in which the controller controls the sender to send a register request to the network automatically when the receiver receives the response message.

7. The apparatus according to claim 6, wherein the warn information comprises a warn-code.

8. The apparatus according to claim 6, wherein the warn information comprises a warn-text.

9. An apparatus, comprising:
 sending means for sending a service request to a network control device of the network, wherein said service recluest is a session initiation protocol invite request;
 receiving means for receiving a response message from the network control device; and
 controlling means, wherein in case the response message comprises a predetermined warn information being a session initiation protocol 403 forbidden message indicating that the user is not registered to the network, the warn information triggers an automatic registration in the controlling means, in which the controlling means controls the sending means to send a register request to the network automatically when the receiving means receives the response message.

10. A method, comprising:
 sending a service request to a network which is configured to offer services to registered users, wherein said service request is a session initiation protocol invite request;
 receiving a response message from the network; and
 wherein in case the response message comprises a predetermined warn information being a session initiation protocol 403 forbidden message indicating that the user is not registered to the network, the warn information triggers an automatic registration, in which a register request is sent to the network automatically when the response message is received.

11. The method according to claim 10, wherein the response message is a session initiation protocol response.

12. The method according to claim 11, wherein the session initiation protocol response is a 403 forbidden response.

13. The method according to claim 10, wherein the warn information comprises a warn-text.

14. The method according to claim 10, wherein the warn information comprises a predefined warn-code.

15. The method according to claim 1, further comprising:
 checking whether the user had a valid registration before or not and whether a de-registration of the user had been performed,
 wherein in case the user had a valid registration before and a de-registration of the user had been performed, during generating the response message, the information that a re-registration is required is inserted into the warn information.

16. The apparatus according to claim 6, further comprising:
 a performer configured to perform an automatic registration to the network in case the response message comprises a predetermined warn information indicating that the user is not registered to the network or information that a re-registration is required, in case the user had a valid registration before and a de-registration of the user had been performed.

17. The apparatus according to claim 9, further comprising:
 performing means for performing an automatic registration to the network in case the response message comprises a predetermined warn information indicating that the user is not registered to the network or information that a re-registration is required, in case the user had a valid registration before and a de-registration of the user had been performed.

18. A computer program embodied on a computer storage readable medium, the computer program being configured to control a processor to perform:
 connecting to a network, wherein the network is configured to offer services to registered users;

sending a service request to the network, wherein said service request is a session initiation protocol invite request;

receiving a response message from the network;

in case the response message comprises a predetermined warn information being a session initiation protocol 403 forbidden message indicating that the user is not registered to the network, triggering an automatic registration in a controller;

controlling a sender to send a register request to the network automatically when the response message is received.

19. An apparatus comprising:

a receiver configured to receive a service request from a network device of a user, wherein said service request is a session initiation protocol invite request;

a controller configured to check, whether the user is registered to a network or not, by referring to information about a registration status of the user stored in a home subscriber server or in the apparatus being a proxy call state control function or a serving call state control function, wherein the network offers services to registered users; and the controller being configured, to, when the user is not registered, generate a response message including warn information and sending the response message from the network control device to the network device of the user, wherein the response message is a session initiation protocol 403 forbidden message;

wherein the warn information triggers an automatic registration in the network device of the user, in which the network device of the user sends a register request to the network control device automatically when the network device of the user receives the response message.

* * * * *